US012779559B2

(12) United States Patent
Okuda

(10) Patent No.: US 12,779,559 B2
(45) Date of Patent: Nov. 3, 2026

(54) GLASS FIBER REINFORCED SUBSTRATE DRILL AND METHOD OF FORMING THROUGH HOLES IN GLASS FIBER REINFORCED SUBSTRATE

(71) Applicant: IBIDEN CO., LTD., Ogaki (JP)

(72) Inventor: Soma Okuda, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 450 days.

(21) Appl. No.: 18/470,570

(22) Filed: Sep. 20, 2023

(65) Prior Publication Data

US 2024/0091866 A1 Mar. 21, 2024

(30) Foreign Application Priority Data

Sep. 20, 2022 (JP) ................................ 2022-149104

(51) Int. Cl.
*B23B 51/02* (2006.01)
*B23B 41/00* (2006.01)

(52) U.S. Cl.
CPC .............. *B23B 51/02* (2013.01); *B23B 41/00* (2013.01); *B23B 2220/36* (2013.01); *B23B 2226/27* (2013.01); *B23B 2251/40* (2013.01); *B23B 2265/00* (2013.01)

(58) Field of Classification Search
CPC ......... B23B 51/02; B23B 51/00; B23B 41/00; B23B 2226/27; B23B 2226/00; B23B 2251/40; B23B 2251/00; B23B 2265/00; B23B 2251/404; B23B 2251/201; B23B 2251/20; B23B 2251/244; B23B 2251/241; B23B 2251/406; B23B 2251/24
USPC ................................ 408/230, 229, 227, 199
See application file for complete search history.

(56) References Cited

U.S. PATENT DOCUMENTS

| | | | | |
|---|---|---|---|---|
| 8,579,557 | B2 * | 11/2013 | Arai | B24B 3/32 408/230 |
| 9,475,128 | B2 * | 10/2016 | Sawabe | B23B 51/00 |
| 9,987,691 | B2 * | 6/2018 | Higashiwaki | B23B 51/009 |
| 2006/0203312 | A1 * | 9/2006 | Van De Sluis | H04N 1/2104 358/527 |
| 2007/0256860 | A1 * | 11/2007 | Norling | E21B 7/008 175/18 |
| 2008/0069654 | A1 * | 3/2008 | Chasse | B27G 17/00 408/227 |

(Continued)

FOREIGN PATENT DOCUMENTS

JP 2021-070139 A 5/2021

*Primary Examiner* — Lawrence Averick
(74) *Attorney, Agent, or Firm* — Finnegan, Henderson, Farabow, Garrett & Dunner, LLP

(57) ABSTRACT

A drill for forming through holes in a glass fiber reinforced substrate includes a drill body having a cutting edge part on a front end side, and a neck part on a base end side. The cutting edge part has a larger diameter than the neck part. The drill body has a step formed between the cutting edge and neck parts and a single continuous chip evacuation groove having main and secondary grooves. The main groove has an L-shaped cross section and is extending from front end of the cutting edge part over the step to the neck part. The secondary groove has a U-shaped cross section and smaller groove width and depth than the main groove and is extending along the main groove from the front end of the cutting edge part over the step to the neck part and merging into the main groove at the neck part.

20 Claims, 4 Drawing Sheets

(56) References Cited

U.S. PATENT DOCUMENTS

| | | | | |
|---|---|---|---|---|
| 2013/0142583 | A1* | 6/2013 | Arai | B24B 3/32 408/229 |
| 2014/0212234 | A1* | 7/2014 | Sawabe | B23B 51/0018 408/221 |
| 2017/0056981 | A1* | 3/2017 | Higashiwaki | B23B 35/00 |
| 2019/0299352 | A1* | 10/2019 | Michiwaki | B23B 51/00 |

* cited by examiner

A - A

GLASS FIBER REINFORCED SUBSTRATE DRILL AND METHOD OF FORMING THROUGH HOLES IN GLASS FIBER REINFORCED SUBSTRATE

CROSS-REFERENCE TO RELATED APPLICATIONS

The present application is based upon and claims the benefit of priority to Japanese Patent Application No. 2022-149104, filed Sep. 20, 2022, the entire contents of which are incorporated herein by reference.

BACKGROUND OF THE INVENTION

Field of the Invention

The present invention relates to a drill for forming through holes in a glass fiber reinforced substrate that forms a core substrate or the like of a high-density printed wiring board used in a server or the like, and a method of forming through holes in a glass fiber reinforced substrate.

Description of Background Art

Japanese Patent Application Laid-Open Publication No. 2021-070139 describes a drill for forming a through hole in a glass fiber reinforced substrate. The entire contents of this publication are incorporated herein by reference.

SUMMARY OF THE INVENTION

According to one aspect of the present invention, a drill for forming through holes in a glass fiber reinforced substrate includes a drill body having a cutting edge part on a front end side of the drill body, and a neck part on a base end side of the drill body such that the cutting edge part has a larger diameter than the neck part and that the drill body has a step formed between the cutting edge part and the neck part. The drill body has a single continuous chip evacuation groove, and the single continuous chip evacuation groove formed in the drill body has a main groove and a secondary groove such that the main groove has an L-shaped cross section and is extending from a front end of the cutting edge part over the step to the neck part and that the secondary groove has a U-shaped cross section and a smaller groove width and a smaller groove depth than the main groove and is extending along the main groove from the front end of the cutting edge part over the step to the neck part and merging into the main groove at the neck part.

According to another aspect of the present invention, a method of forming through holes in a glass fiber reinforced substrate includes providing a drill having a drill body having a cutting edge part on a front end side of the drill body, and a neck part on a base end side of the drill body such that the cutting edge part has a larger diameter than the neck part and that the drill body has a step formed between the cutting edge part and the neck part, and drilling a through hole in a glass fiber reinforced substrate using the drill. The drill body has a single continuous chip evacuation groove, and the single continuous chip evacuation groove formed in the drill body has a main groove and a secondary groove such that the main groove has an L-shaped cross section and is extending from a front end of the cutting edge part over the step to the neck part and that the secondary groove has a U-shaped cross section and a smaller groove width and a smaller groove depth than the main groove and is extending along the main groove from the front end of the cutting edge part over the step to the neck part and merging into the main groove at the neck part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
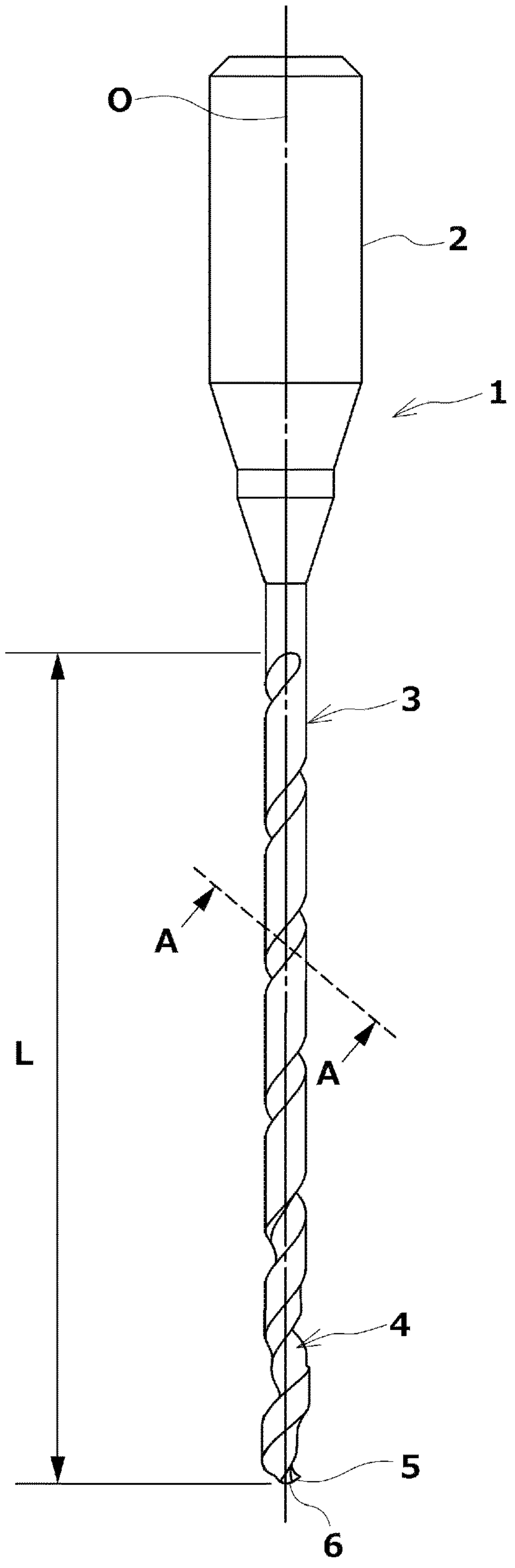
FIG. 1 is a side view illustrating a glass fiber reinforced substrate drill according to an embodiment of the present invention.

Embodiments will now be described with reference to the accompanying drawings, wherein like reference numerals designate corresponding or identical elements throughout the various drawings.

Figure 2:
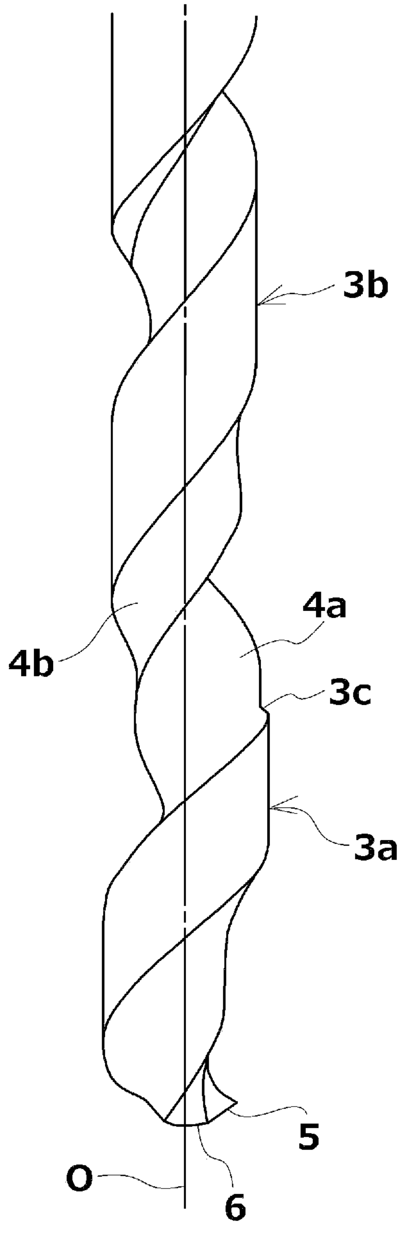
FIG. 2 illustrates an enlarged side view of a front end portion of a drill body of a glass fiber reinforced substrate drill according to an embodiment of the present invention.
Figure 3:
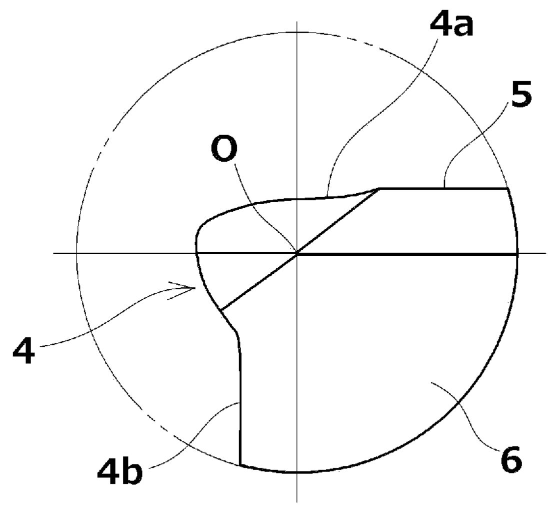
FIG. 3 illustrates an enlarged end view of a front end portion of a drill body of a glass fiber reinforced substrate drill according to an embodiment of the present invention.
Figure 4:
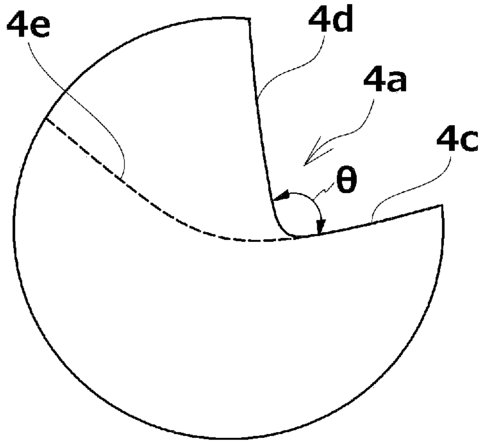
FIG. 4 is a schematic diagram illustrating a cross-sectional shape of a main groove of a drill body of a glass fiber reinforced substrate drill according to an embodiment of the present invention in comparison with a cross-sectional shape of a main groove of a drill body of a conventional glass fiber reinforced substrate drill.
Figure 5:
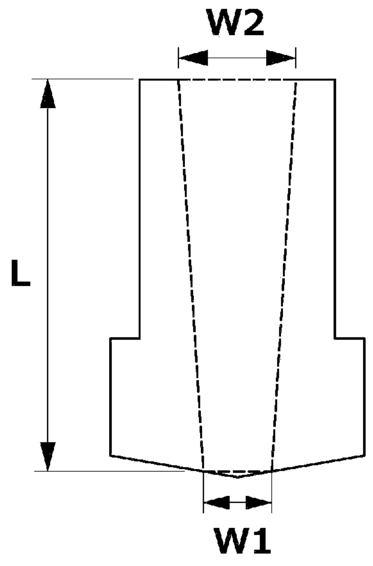
FIG. 5 is an explanatory diagram illustrating a web taper of a drill body of a glass fiber reinforced substrate drill according to an embodiment of the present invention.

FIG. 1 is a side view illustrating a glass fiber reinforced substrate drill according to an embodiment of the present invention. FIGS. 2 and 3 respectively illustrate an enlarged side view and an enlarged end view of a front end portion of a drill body of the glass fiber reinforced substrate drill of the embodiment. Further, FIG. 4 is a schematic diagram illustrating a cross-sectional shape of a main groove of the drill body of the glass fiber reinforced substrate drill of the embodiment along an A-A line in FIG. 1 in comparison with a cross-sectional shape of a main groove of a drill body of a conventional glass fiber reinforced substrate drill, and FIG. 5 is an explanatory diagram illustrating a web taper of the glass fiber reinforced substrate drill of the embodiment.

The glass fiber reinforced substrate drill of this embodiment indicated by a reference numeral symbol "1" in FIG. 1 includes: a shank 2 that is to be gripped by a chuck or the like of a machine tool; and a drill body 3 that is formed on a drill central axis (O) together with the shank 2 and of which a base end (upper end in FIG. 1) is integrally connected to the shank 2. The drill body 3 is of an undercut type having a cutting edge part (3*a*) on a front end side, and a neck part (3*b*) on a base end side having a smaller diameter than the cutting edge part (3*a*). The cutting edge part (3*a*) has an outer diameter of, for example, 0.17 mm, and the neck part (3*b*) has an outer diameter of, for example, 0.15 mm, and a step (3*c*) is formed between the cutting edge part (3*a*) and the neck part (3*b*).

Similar to that of a regular drill, the cutting edge part (3*a*) has a cutting edge 5 and a leading relief surface 6 positioned on a trailing side of the cutting edge in a cutting rotation direction of the drill, which is a clockwise direction in FIG. 3. The leading relief surface 6 has a single surface structure in the illustrated example. However, it is also possible that the leading relief surface 6 has a multi-stepped surface structure formed in a circumferential direction with respect to an axis.

The drill body 3 has a single continuous chip evacuation groove 4 with a predetermined helix angle. The chip evacuation groove 4 has a main groove (4*a*) and a secondary groove (4*b*). The main groove (4*a*) extends from a front end of the cutting edge part (3*a*) over the step (3*c*) to the neck part (3*b*). The secondary groove (4*b*) has a smaller groove width and a smaller groove depth in a cross section thereof compared to the main groove (4*a*) and extends along the main groove (4*a*) from the front end of the cutting edge part (3*a*) over the step (3*c*) to the neck part (3*b*), merging into the main groove (4*a*) at the neck part (3*b*). The width of the main groove (4*a*) is, for example, 0.02 mm-0.25 mm, and the width of the secondary groove (4*b*) is, for instance, 0.02 mm-0.12 mm, as long as it is smaller than the width of the associated main groove (4*a*).

As indicated by a dotted line in FIG. 4, a cross-sectional shape of a main groove (4*a*) in a conventional glass fiber reinforced substrate drill has a shallow substantially U-shaped profile with low wall parts (4*e*) that are left-right symmetrical with respect to a plane containing the drill central axis (O). In this groove shape, it is thought that the wall parts (4*e*) positioned on the left and right are low, and thus, are thin in an up-down direction, resulting in a reduced bending rigidity. Further, it is thought that, when the drill cuts into a substrate, chips pushed by the right wall part (4*e*) are pressed against an inner peripheral surface of a hole in the substrate, roughening the inner peripheral surface and becoming difficult to escape from the hole.

In contrast, as indicated by a solid line in FIG. 4, a cross-sectional shape of the main groove (4*a*) of the glass fiber reinforced substrate drill of this embodiment has a substantially L-shaped profile, with a side wall part (4*c*) on one side connecting to the cutting edge 5 and a side wall part (4*d*) on the other side connecting to the leading relief surface 6. In this groove shape, it is thought that the two side wall parts (4*c*, 4*d*) positioned on both sides of the main groove (4*a*) each form a substantially linear shape and are closer to each other compared to a conventional drill, and thus, are thicker in the up-down direction compared to a conventional drill, resulting in an increased bending rigidity. Further, it is thought that, when the drill cuts into a substrate, chips pushed in a rotation direction of the drill by the side wall part (4*c*) on the one side are guided by the side wall part (4*d*) on the other side and are likely to escape rearward from a hole in the substrate.

In the cross section of the main groove (4*a*), as illustrated in FIG. 4, an included angle (θ) between the side wall part (4*c*) on the one side connecting to the cutting edge 5 and the side wall part (4*d*) on the other side connecting to the leading relief surface 6 is 80-100 degrees. When the included angle (θ) is less than 80 degrees, the main groove (4*a*) becomes narrower, and when the included angle (θ) exceeds 100 degrees, the chip guiding function of the side wall part (4*d*) on the other side is reduced. In either case, chip evacuation performance is decreased.

In a predetermined cross section of the main groove (4*a*), for example, as illustrated in FIG. 4, excluding the secondary groove (4*b*), a cross-sectional width of the side wall part (4*c*) on the one side connecting to the cutting edge 5 is smaller than a cross-sectional width of the side wall part (4*d*) on the other side connecting to the leading relief surface 6. As a result, the chip guiding function of the side wall part (4*d*) on the other side is enhanced, and chip evacuation performance is improved.

In a predetermined cross section of the main groove (4*a*), for example, as illustrated in FIG. 4, excluding the secondary groove (4*b*), the cross-sectional width of the side wall part (4*d*) on the other side connecting to the leading relief surface 6 is 1.2-1.4 times the cross-sectional width of the side wall part (4*c*) on the one side connecting to the cutting edge 5. As a result, the chip guiding function of the side wall part (4*d*) on the other side is enhanced, and chip evacuation performance is improved.

In a range along an extension direction of the drill central axis (O) of the drill body 3, where the chip evacuation groove 4 is formed, a portion other than the chip evacuation groove 4 forms a drill core of a length (L). The drill core has a web taper (WT) of 0.022-0.024.

The web taper (WT) is defined by the formula WT=(W2−W1)/L, where W1: drill core front end part diameter; W2: drill core base part diameter; and L: drill core length The drill core front end part diameter (W1) is the outer diameter of the cutting edge part (3*a*) minus a front end part depth of the chip evacuation groove 4, and the drill core base part diameter (W2) is an outer diameter of a neck part (3*b*) minus a base part depth of the chip evacuation groove 4.

In a conventional glass fiber reinforced substrate drill that has only a single continuous chip evacuation groove, for example, with W1=0.020 mm, W2=0.106 mm, and L=3.3 mm, the web taper (WT) is 0.026, resulting in a chip evacuation groove volume ratio of 40.5%. In contrast, in the glass fiber reinforced substrate drill 1 of this embodiment, for example, with W1=0.020 mm, W2=0.093-0.099 mm, and L=3.3 mm, the web taper (WT) is 0.022-0.024, resulting in a chip evacuation groove volume ratio of 42%.

According to the glass fiber reinforced substrate drill of this embodiment, by having only a single chip evacuation groove 4 and merging the secondary groove (4*b*) of the chip evacuation groove 4 into the main groove (4*a*) along its length, and furthermore, by forming the main groove (4*a*) to have an L-shaped cross section, the bending rigidity is increased compared to that of a conventional glass fiber reinforced substrate drill. Therefore, during a process of drilling holes into a high-strength thick glass fiber reinforced substrate, small-diameter through holes can be formed at a narrow pitch without bending the drill.

Further, according to the glass fiber reinforced substrate drill of this embodiment, by setting the web taper (WT) of the drill core to 0.022-0.024 and increasing a depth ratio of the chip evacuation groove 4, combined with forming the main groove (4*a*) to have an L-shaped cross section to guide chips along the side wall parts, chips are more likely to escape from the holes compared to a conventional glass fiber reinforced substrate drill. Therefore, during a process of drilling through holes in a high-strength glass fiber reinforced substrate, roughening of inner wall surfaces of the through holes due to chips is avoided, and connection reliability of through-hole conductors formed on the inner wall surfaces is improved.

In recent years, with the increase in density of printed wiring boards for servers, there has been a demand for narrower pitches for through hole conductors provided in core substrates of such high-density printed wiring boards. To achieve a narrower pitch, the diameter of the through holes for forming the through-hole conductors is reduced.

Due to countermeasures against warping, a core substrate cannot be formed thin and is often reinforced with glass fibers contained in an insulating resin. Therefore, when a drill for forming a through hole is reduced in diameter, the drill may bend without being able to penetrate the core substrate. Therefore, even with a small drill diameter, a drill capable of penetrating a thick glass fiber reinforced substrate that forms a core substrate is required.

For example, Japanese Patent Application Laid-Open Publication No. 2021-070139 describes a drill for forming a through hole in a glass fiber reinforced substrate. This drill has a drill body with a cutting edge part on a front end side and a neck part on a base end side having a smaller diameter than the cutting edge part. The drill body has only a single continuous chip evacuation groove and a drill core with a web taper (WT) of 0.022-0.024.

The chip evacuation groove has a main groove and a secondary groove that extends along the main groove, merging into the main groove along its length. The web taper (WT) is defined as WT=(W2−W1)/L, where W2 is a drill core base part diameter, W1 is a drill core front end part diameter, and L is a drill core length.

According to this glass fiber reinforced substrate drill, by having only a single chip evacuation groove and merging a secondary groove, which extends along the main groove of the chip evacuation groove, into the main groove along its length, rigidity is increased. Further, by reducing the web taper (WT) of the drill core to 0.022-0.024 smaller than that of a conventional drill and increasing a depth ratio of the chip evacuation groove, chips roughening an inner wall surface of a through hole can be easily discharged from the hole, enhancing connection reliability of through-hole conductor formed on the inner wall surface.

However, even with this glass fiber reinforced substrate drill, when attempting to form a through hole with a hole diameter of 150 μm or less in a glass fiber reinforced substrate with a thickness of 700 μm or more that forms a core substrate, there has been a problem that bending rigidity of the drill is insufficient so that the drill bends during drilling and cannot penetrate the glass fiber reinforced substrate.

A drill for forming through holes in a glass fiber reinforced substrate according to an embodiment of the present invention has high bending rigidity even with a small drill diameter, allowing through holes to be formed in a thick glass fiber reinforced substrate and allowing small-diameter through holes to be formed at a small pitch.

A glass fiber reinforced substrate drill according to an embodiment of the present invention for forming through holes in a glass fiber reinforced substrate, includes a drill body that has a cutting edge part on a front end side and a neck part on a base end side. A front end of the cutting edge part has a cutting edge, and a leading relief surface positioned on a trailing side of the cutting edge in a cutting rotation direction of the drill. The cutting edge part has a larger diameter than the neck part. There is a step between the cutting edge part and the neck part. The drill body has only a single continuous chip evacuation groove and a drill core having a web taper (WT) of 0.022-0.024. The chip evacuation groove has a main groove that has an L-shaped cross section and extends from the front end of the cutting edge part over the step to the neck part, and a secondary groove that has a U-shaped cross section, has a smaller groove width and a smaller groove depth than the main groove, and extends along the main groove from the front end of the cutting edge part over the step to the neck part, merging into the main groove at the neck part, and the web taper (WT) is defined by WT=(W2−W1)/L, where W1 is a drill core front end part diameter, W2 is a drill core base part diameter, and L is a drill core length.

In a glass fiber reinforced substrate drill according to an embodiment of the present invention, it is preferable that the secondary groove merges into the main groove within 30%-50% of a total length of the drill body, measured from a front end of the drill body. Further, it is preferable that the main groove has a width of 0.02 mm-0.25 mm, and the secondary groove has a width of 0.02 mm-0.12 mm.

Further, in a glass fiber reinforced substrate drill according to an embodiment of the present invention, it is preferable that an included angle between a side wall part on one side connecting to the cutting edge and a side wall part on the other side connecting to the leading relief surface, which form the main groove, is 80-100 degrees in a predetermined cross section. Further, it is preferable that, in a predetermined cross section, a cross-sectional width of the side wall part on the one side is smaller than a cross-sectional width of the side wall part on the other side. And, it is preferable that, in a predetermined cross section, the cross-sectional width of the side wall part on the other side is 1.2-1.4 times the cross-sectional width of the side wall part on the one side.

Obviously, numerous modifications and variations of the present invention are possible in light of the above teachings. It is therefore to be understood that within the scope of the appended claims, the invention may be practiced otherwise than as specifically described herein.

The invention claimed is:

1. A drill for forming through holes in a glass fiber reinforced substrate, comprising:

a drill body having a cutting edge part on a front end side of the drill body, and a neck part on a base end side of the drill body such that the cutting edge part has a larger diameter than the neck part and that the drill body has a step formed between the cutting edge part and the neck part, wherein the drill body has a single continuous chip evacuation groove, the single continuous chip evacuation groove formed in the drill body has a main groove and a secondary groove such that the main groove has an L-shaped cross section and is extending from a front end of the cutting edge part over the step to the neck part and that the secondary groove has a U-shaped cross section and a smaller groove width and a smaller groove depth than the main groove and is extending along the main groove from the front end of the cutting edge part over the step to the neck part and merging into the main groove at the neck part, and the drill body is formed such that the secondary groove is merging into the main groove within a range of 30% to 50% of a total length of the drill body, measured from a front end of the drill body.

2. The drill according to claim 1, wherein the drill body is formed such that the main groove has a width in a range of 0.02 mm to 0.25 mm and that the secondary groove has a width in a range of 0.02 mm to 0.12 mm.

3. The drill according to claim 2, wherein the cutting edge part of the drill body has the front end having a cutting edge and a leading relief surface positioned on a trailing side of the cutting edge in a cutting rotation direction of the drill, and the drill body is formed such that an included angle between a side wall part on one side connecting to the cutting edge and a side wall part on the other side connecting to the leading relief surface, which form the main groove, is in a range of 80 to 100 degrees in a cross section.

4. The drill according to claim 3, wherein the drill body is formed such that a cross-sectional width of the side wall part on the one side is smaller than a cross-sectional width of the side wall part on the other side.

5. The drill according to claim 4, wherein the drill body is formed such that the cross-sectional width of the side wall part on the other side is in a range of 1.2 to 1.4 times the cross-sectional width of the side wall part on the one side.

6. The drill according to claim 2, wherein the drill body has a drill core having a web taper, WT=(W2−W1)/L, in a range of 0.022 to 0.024 where W1 is a drill core front end part diameter, W2 is a drill core base part diameter, and L is a drill core length.

7. The drill according to claim 2, wherein the cutting edge part of the drill body has the front end having a cutting edge and a leading relief surface positioned on a trailing side of the cutting edge in a cutting rotation direction of the drill.

8. The drill according to claim 1, wherein the cutting edge part of the drill body has the front end having a cutting edge and a leading relief surface positioned on a trailing side of the cutting edge in a cutting rotation direction of the drill, and the drill body is formed such that an included angle between a side wall part on one side connecting to the cutting edge and a side wall part on the other side connecting to the leading relief surface, which form the main groove, is in a range of 80 to 100 degrees in a cross section.

9. The drill according to claim 8, wherein the drill body is formed such that a cross-sectional width of the side wall part on the one side is smaller than a cross-sectional width of the side wall part on the other side.

10. The drill according to claim 9, wherein the drill body is formed such that the cross-sectional width of the side wall part on the other side is in a range of 1.2 to 1.4 times the cross-sectional width of the side wall part on the one side.

11. The drill according to claim 1, wherein the drill body has a drill core having a web taper, WT=(W2−W1)/L, in a range of 0.022 to 0.024 where W1 is a drill core front end part diameter, W2 is a drill core base part diameter, and L is a drill core length.

12. The drill according to claim 1, wherein the cutting edge part of the drill body has the front end having a cutting edge and a leading relief surface positioned on a trailing side of the cutting edge in a cutting rotation direction of the drill.

13. The drill according to claim 12, wherein the drill body is formed such that a cross-sectional width of the side wall part on the one side is smaller than a cross-sectional width of the side wall part on the other side.

14. The drill according to claim 12, wherein the drill body is formed such that the cross-sectional width of the side wall part on the other side is in a range of 1.2 to 1.4 times the cross-sectional width of the side wall part on the one side.

15. A drill for forming through holes in a glass fiber reinforced substrate, comprising:

a drill body having a cutting edge part on a front end side of the drill body, and a neck part on a base end side of the drill body such that the cutting edge part has a larger diameter than the neck part and that the drill body has a step formed between the cutting edge part and the neck part, wherein the drill body has a single continuous chip evacuation groove, the single continuous chip evacuation groove formed in the drill body has a main groove and a secondary groove such that the main groove has an L-shaped cross section and is extending from a front end of the cutting edge part over the step to the neck part and that the secondary groove has a U-shaped cross section and a smaller groove width and a smaller groove depth than the main groove and is extending along the main groove from the front end of the cutting edge part over the step to the neck part and merging into the main groove at the neck part, and the drill body is formed such that the main groove has a width in a range of 0.02 mm to 0.25 mm and that the secondary groove has a width in a range of 0.02 mm to 0.12 mm.

16. The drill according to claim 15, wherein the cutting edge part of the drill body has the front end having a cutting edge and a leading relief surface positioned on a trailing side of the cutting edge in a cutting rotation direction of the drill, and the drill body is formed such that an included angle between a side wall part on one side connecting to the cutting edge and a side wall part on the other side connecting to the leading relief surface, which form the main groove, is in a range of 80 to 100 degrees in a cross section.

17. The drill according to claim 16, wherein the drill body is formed such that a cross-sectional width of the side wall part on the one side is smaller than a cross-sectional width of the side wall part on the other side.

18. The drill according to claim 17, wherein the drill body is formed such that the cross-sectional width of the side wall part on the other side is in a range of 1.2 to 1.4 times the cross-sectional width of the side wall part on the one side.

19. The drill according to claim 15, wherein the drill body has a drill core having a web taper, WT=(W2−W1)/L, in a range of 0.022 to 0.024 where W1 is a drill core front end part diameter, W2 is a drill core base part diameter, and L is a drill core length.

20. The drill according to claim 15, wherein the cutting edge part of the drill body has the front end having a cutting edge and a leading relief surface positioned on a trailing side of the cutting edge in a cutting rotation direction of the drill.

* * * * *